United States Patent [19]

Abiko et al.

[11] Patent Number: 5,204,043

[45] Date of Patent: Apr. 20, 1993

[54] METHOD OF MANUFACTURING STEERING WHEEL

[75] Inventors: Toru Abiko; Katunobu Sakane; Mitsuru Harata; Hiroshi Yasuda, all of Aichi, Japan

[73] Assignees: Toyoda Gosei Co., Ltd., Nishigasugai, Japan; Kolbenschmidt Aktiengesellschaft, Neckarsulm, Fed. Rep. of Germany

[21] Appl. No.: 831,667

[22] Filed: Feb. 6, 1992

Related U.S. Application Data

[63] Continuation of Ser. No. 639,658, Jan. 11, 1991, abandoned.

[30] Foreign Application Priority Data

Jan. 13, 1990 [JP] Japan ................................. 2-4959

[51] Int. Cl.$^5$ .................... B29C 45/14; B29C 33/12
[52] U.S. Cl. .............................. 264/267; 264/275; 264/328.12
[58] Field of Search ................. 264/268, 271.1, 274, 264/275, 279.1, 328.12, 267; 425/129.1

[56] References Cited

U.S. PATENT DOCUMENTS

| | | | |
|---|---|---|---|
| 3,237,480 | 3/1966 | Phelon | 74/552 |
| 3,856,360 | 12/1974 | Lindberg et al. | 420/534 |
| 4,006,210 | 2/1977 | Denton | 264/328.12 |
| 4,062,704 | 12/1977 | Sperry et al. | 420/533 |
| 4,448,091 | 5/1984 | Bauer et al. | 74/552 |
| 4,793,659 | 12/1988 | Oleff et al. | 264/328.12 |
| 4,811,472 | 3/1989 | Kabayashi | 264/328.12 |

FOREIGN PATENT DOCUMENTS

| | | | |
|---|---|---|---|
| 132650 | 2/1985 | European Pat. Off. | 420/534 |
| 2100437 | 8/1972 | Fed. Rep. of Germany | 74/552 |
| 3702847 | 8/1987 | Fed. Rep. of Germany . | |
| 2518480 | 6/1983 | France | 74/552 |
| 45-31050 | 10/1970 | Japan | 420/534 |
| 48-38051 | 11/1973 | Japan | 420/534 |
| 58-63573 | 4/1983 | Japan | 74/552 |
| 59-192669 | 11/1984 | Japan | 74/552 |
| 60-82643 | 5/1985 | Japan | 420/534 |
| 60-113770 | 6/1985 | Japan . | |
| 62-16559 | 1/1987 | Japan . | |
| 341185 | 1/1931 | United Kingdom | 74/552 |
| 1210264 | 10/1970 | United Kingdom | 420/534 |
| 2058694 | 4/1981 | United Kingdom . | |

OTHER PUBLICATIONS

English Abstract of Kubo et al. Japanese Laid Open Application No. 60-113770, Jun., 1985.
Japanese Industrial Standard UDC 669.715-143, Aluminum Alloy Die Castings, JIS H 5302-1976, pp. 1-5.

*Primary Examiner*—Jan H. Silbaugh
*Assistant Examiner*—Angela Ortiz
*Attorney, Agent, or Firm*—Cushman, Darby & Cushman

[57] ABSTRACT

A method of manufacturing a steering wheel, in which a coating layer is molded of a synthetic resin, by using a molding die unit, on at least the annular portion of a steering wheel core including a boss. The annular portion is located around the boss and has a groove extending in the circumferential direction thereof. Spokes couple the boss and the annular portion to each other. The method includes a die opening step in which an upper molding die and a lower molding die, which have a gate formed at the separation surfaces of the dies and communicating with the molding cavity of the die unit, are opened from each other. The second step is a core setting step in which the core is set in the cavity so that the outermost part of the groove of the annular portion having walls defining the groove between them is located as the top of the groove, one of the walls, which faces the gate and has a notched part notched to be smaller in height than the other of the walls, faces the gate at the notched part, and the top of the notched part is located below the separation surfaces. Third, a coating layer molding step is carried out in which the dies are closed on each other and the resin is injected into the cavity through the gate so that the coating layer is molded of the resin on the core. Last and a steering wheel takeout step in which the dies are opened from each other and the wheel is taken out from the dies is accomplished.

6 Claims, 4 Drawing Sheets

METHOD OF MANUFACTURING STEERING WHEEL

This application is a continuation of Ser. No. 07/639,658, filed on Jan. 11, 1991, now abandoned.

BACKGROUND OF THE INVENTION

1. Field of the Invention

The present invention relates to a method of manufacturing a steering wheel, and more particularly relates to a method of manufacturing a steering wheel, in which a coating layer is molded of a synthetic resin on a steering wheel core including an annular portion having a groove extending in the circumferential direction of the portion.

2. Description of the Prior Art

The cross section of at least the annular portion of the core of a steering wheel is U-shaped in order to reduce the weight of the core, namely, the weight of the wheel as a whole, as disclosed in the Japan Utility Model Application (OPI) No. 16559/87 (the term "OPI" as used herein means an "unexamined published application"). When such a steering wheel is to be manufactured, the core thereof is set in a molding cavity 54 defined by an upper molding die and a lower molding die 101 and 102, so that the outermost part 53 of the groove 52 of the annular portion 51 of the core is located as the top of the groove, as shown in FIG. 9. A synthetic resin 56 such as urethane, polypropylene and vinyl chloride is then injected into the cavity 54 through a gate 55 provided at the separation surfaces 112 of a molding die unit 100 consisting of the molding dies 101 and 102, so that a coating layer is molded of the resin on the core.

However, in such a method of manufacturing the steering wheel, if the injection of the synthetic resin 56 is completed in a short time, the synthetic resin injected through the gate 55 runs onto a wall 58 facing the gate and included in the annular portion 51 including another wall 57 and having the groove 52 defined between the walls 57 and 58 and gravitates on the wall 58 so that the resin starts filling the cavity 54 from the bottom thereof, the surface of the resin rises over the wall, and the resin flows down into the groove. In that case, since the resin 56 flows down into the groove 52 while involving much air, the coating layer is likely to have a cavity therein. Besides, the speed of the filling of the cavity 54 with the resin from the bottom of the cavity changes at the time of the inflow of the resin into the groove 52 so that the outside surface of the coating layer is likely to have a luster nonuniformity. Since the coating layer is likely to have such molding defects, it is difficult to properly manufacture the steering wheel in a short time. This is a problem.

SUMMARY OF THE INVENTION

The present invention was made in order to solve the problem mentioned above. Accordingly, it is an object of the present invention to provide a method of manufacturing a steering wheel in a short time so that a molding defect such as a cavity is less likely to be caused.

In the method, a coating layer is molded of a synthetic resin, by using a molding die unit, on at least the annular portion of a steering wheel core including a boss, the annular portion located around the boss and having a groove extending in the circumferential direction of the annular portion, and spokes coupling the boss and the portion to each other. The method of the present invention is characterized by comprising a die opening step in which an upper and a lower molding die, which have a gate formed at the separation surfaces of the dies and communicating with the molding cavity of the molding die unit, are opened from each other; a core setting step in which the steering wheel core is set in the molding cavity so that the outermost part of the groove of the annular portion having walls defining the groove between them is located as the top of the groove, one of the walls, which faces the gate and has a notched part notched to be smaller in height than the other of the walls, faces the gate at the notched part, and the top of the notched part is located below the separation surfaces of the dies; a coating layer molding step in which the dies are closed on each other and the synthetic resin is injected into the molding cavity through the gate so that the coating layer is molded of the resin on the core; and a steering wheel takeout step in which the die are opened from each other and the wheel is taken out from the dies.

In the coating layer molding step, the synthetic resin first flows into the groove of the annular portion of the core through the notched part of the portion, and thereafter starts filling the molding cavity from the bottom thereof gradually. Since the groove is thus filled with the resin before the cavity is filled with it, the resin does not flow from the cavity into the groove over the wall. For that reason, air is prevented from being involved by the resin into the groove to cause a molding defect such as a cavity and a luster nonuniformity when the coating layer is molded of the resin. It is thus made possible to inject the resin and mold the coating layer in a short time.

DETAILED DESCRIPTION OF EXEMPLARY EMBODIMENTS

Embodiments of the present invention are hereafter described in detail with reference to the drawings attached hereto.

Figure 1:
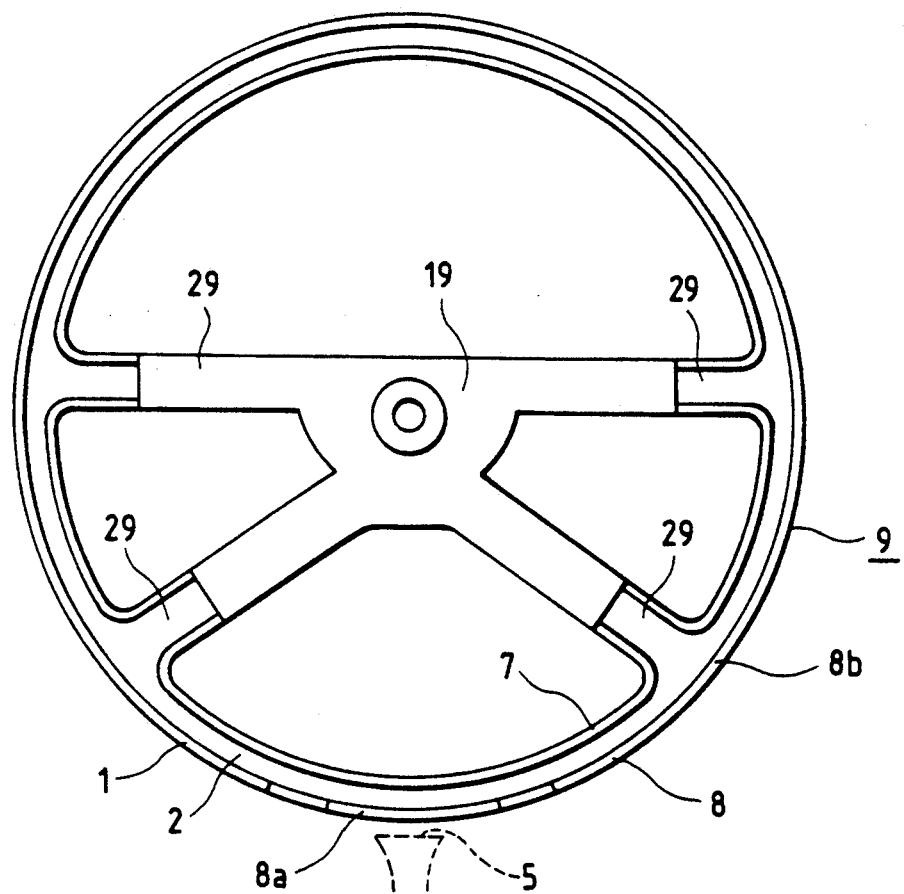
FIG. 1 is a bottom view of the steering wheel core on which a coating layer is molded of a synthetic resin in a method which is an embodiment of the present invention.
Figure 2:
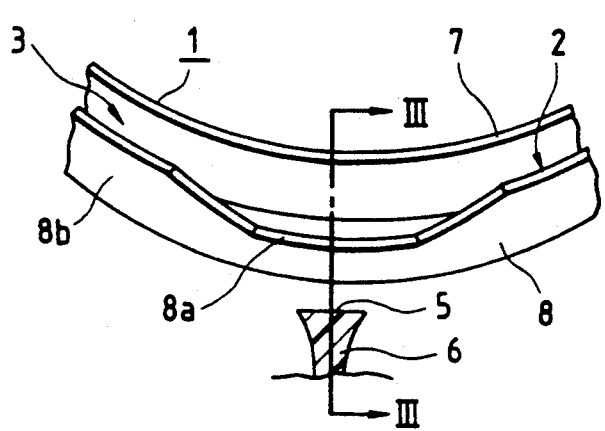
FIG. 2 is an enlarged partial perspective view of the core.

FIGS. 1, 2, 3, 4, 5 and 6 are for describing a method which is one of the embodiments and in according to a steering wheel 15 is manufactured. In the method, the core 9 of the steering wheel is composed of a boss 19, an annular portion 1 located around the boss and having a groove 2 having a nearly U-shaped cross section and extending in the circumferential direction of the annular portion, and spokes 29 coupling the boss and the annular portion to each other, as shown in FIG. 1. The annular portion 1 has two walls 7 and 8 defining the groove 2 between them. The wall 8 faces a gate 5 provided at the separation surfaces 13 of a molding die unit 12 consisting of an upper and a lower molding dies 10 and 11, and has a notched part 8a which is notched to be smaller in height than the other part 8b of the wall and is located near the gate 5, as shown in FIG. 2. When the core 9 is set in the molding cavity 4 of the molding die unit 12, the top of the notched part 8a of the wall 8 is located below the separation surfaces 13 of the upper and the lower molding dies 10 and 11.

Figure 3:
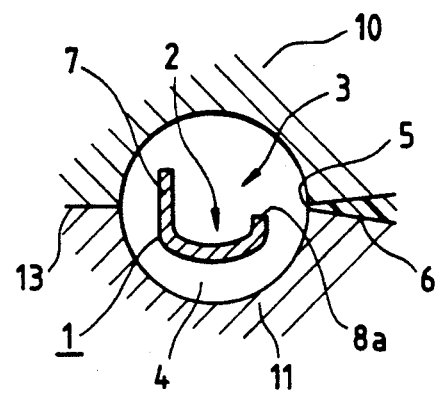
FIG. 3 is a partial sectional view of the core along a line III—III shown in FIG. 2.
Figure 4:
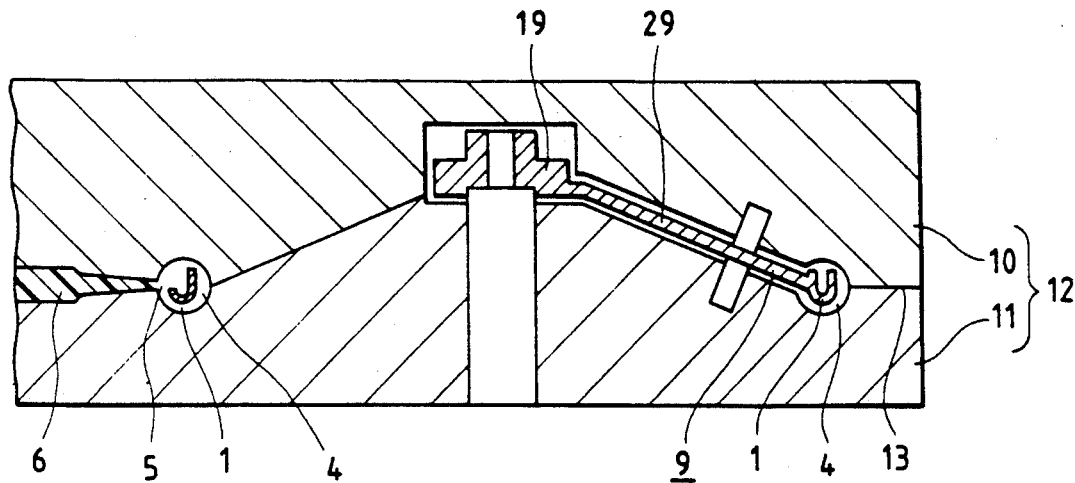
FIG. 4 is a sectional view showing that the core is set in a molding die unit.
Figure 5:
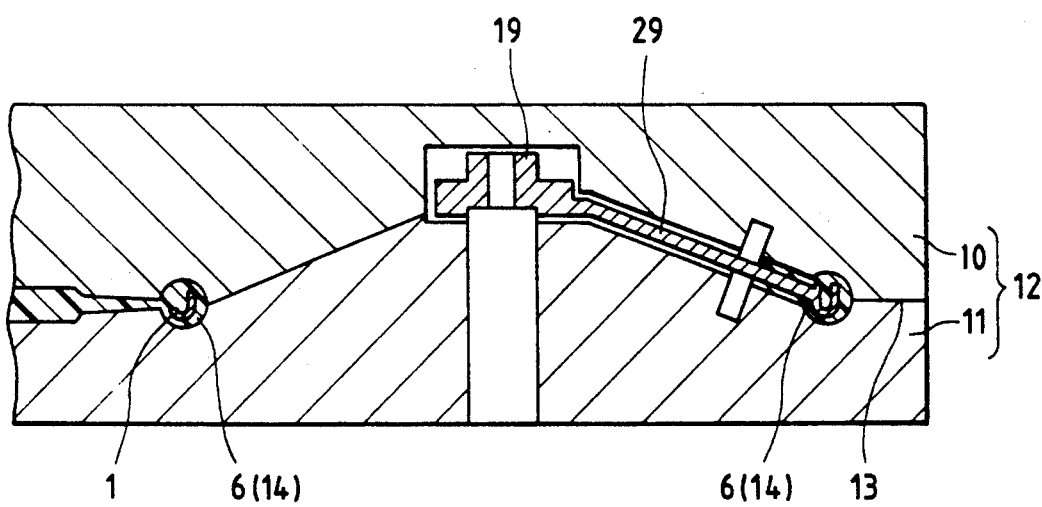
FIG. 5 is a sectional view showing the interior of the cavity of the molding die unit at the end of the molding of the coating layer.
Figure 6:
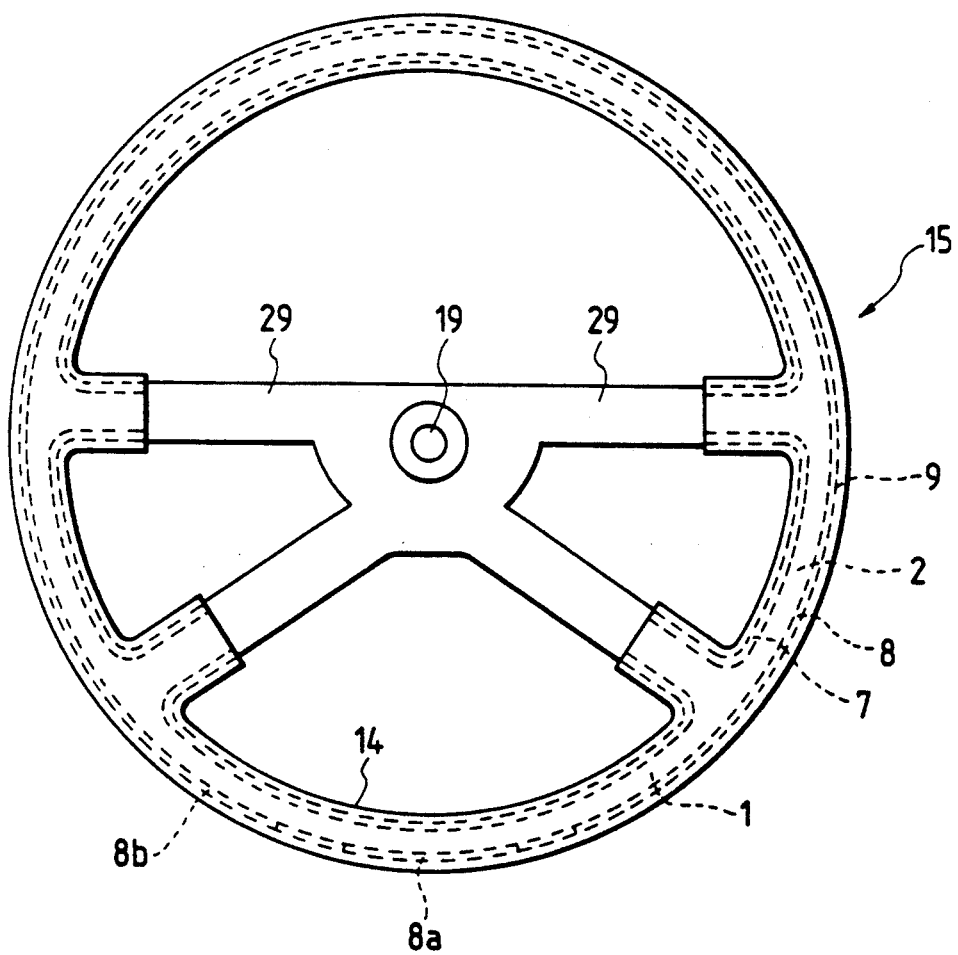
FIG. 6 is a bottom view of a steering wheel having the coating layer molded.

The method of manufacturing the steering wheel, in which a coating layer 14 is now molded on the core 9, is described step by step. In the die opening step of the method, the upper and lower molding dies 10 and 11 of the molding die unit 12, which has the gate 5 formed at the separation surfaces 13 of the dies and communicating with the molding cavity 4, are opened. In the core setting step of the method after that, the core 9 is set in the lower molding die 11 so that the outer most part 3 of the groove 2 of the annular portion 1 of the core is located as the top of the groove, the notched part 8a of the wall 8 of the annular portion faces the gate 5 of the molding die unit 12, and the top of the notched part is located in the molding cavity 4 and below the separation surfaces 13 of the die unit, as shown in FIGS. 3 and 4. In the coating layer molding step of the method after that, the upper and the lower molding dies 10 and 11 are closed on each other, a urethane resin 6 is injected into the molding cavity 4 through the gate 5 so that the coating layer 14 is molded of the urethane resin on the core 9. In that step, since the top of the notched part 8a of the wall 8 facing the gate 5 is located below the separation surfaces 13 of the molding die unit 12, the liquefied urethane resin hardly comes into contact with the wall 8 but passes over the wall and comes into contact with the other wall 7 facing the boss 19, so that the resin gravitates into the groove 2, flows in the groove at the bottom thereof from the notched part in the circumferential direction of the annular portion 1 of the core 9 and overflows the notched part, and most of the resin overflowing the notched part fills the cavity 4 from the bottom gradually. In the coating layer molding step of the method after that, all of the cavity 4 is thus filled with the urethane resin 6 so that the coating layer 14 is molded of the resin on the core 9, as shown in FIG. 5. In the steering wheel takeout step of the method after that, the upper and the lower molding dies 10 and 11 are opened from each other, and the steering wheel 15 with the core 9 and the coating layer 14 molded thereon is taken out from the molding die unit 12, as shown in FIG. 6.

Figure 7:
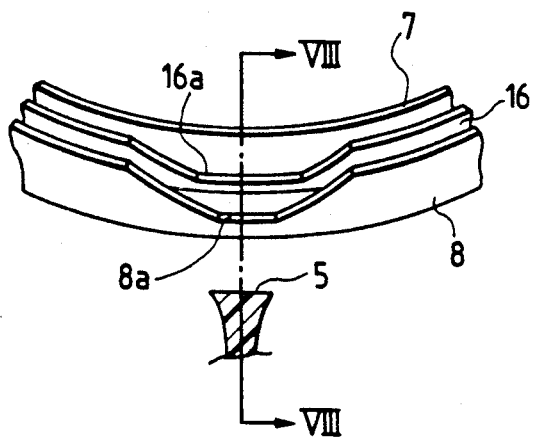
FIG. 7 is an enlarged partial perspective view of a major part of the annular portion of a steering wheel core on which a coating layer is molded in a method which is another embodiment of the present invention.
Figure 8:
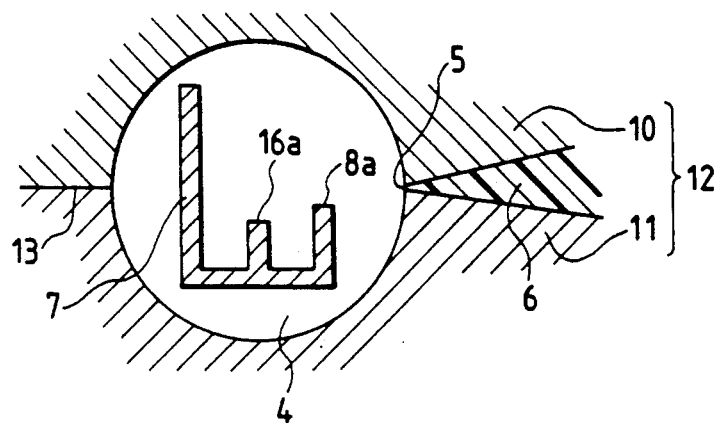
FIG. 8 is a partial sectional view of the major part along a line VIII—VIII shown in FIG. 7.
Figure 9:
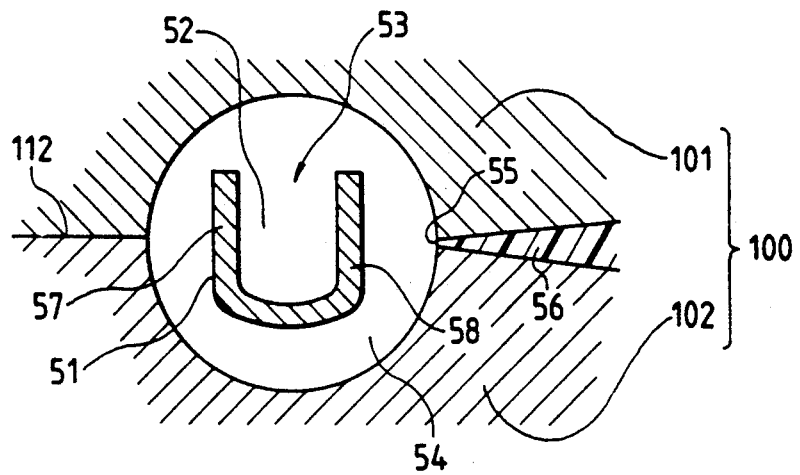
FIG. 9 is a partial sectional view showing that a coating layer is molded of a synthetic resin on a conventional steering wheel core in a conventional method.

The present invention is not confined to the embodiment described above, but may be practiced or embodied in other various ways without departing from the spirit or essential character thereof. For example; in a steering wheel manufacturing method which is another embodiment of the invention, the annular portion 1 of the core of a steering wheel is made of three walls 7, 8 and 16, as shown in FIGS. 7 and 8. The wall 8, which faces the gate 5 of a molding die unit 12, and the central wall 16 have notched parts 8a and 16a, which are located near the gate. The parts 8a and 16a are notched to be smaller in height than the other wall 7 facing the boss of the core. It is preferable that the notched part 16a of the central wall 16 is made smaller in height than that 8a of the wall 8 but larger in circumferential length than the latter to cause a synthetic resin 6 to more efficiently flow into the narrow grooves 2 of the annular portion 1 of the core.

What is claimed is:

1. A method of manufacturing a steering wheel, said steering wheel including a center boss portion, a core member having an annular portion located around said boss portion, and at least one spoke coupling said boss portion to said annular portion of the core member, said steering wheel also including a coating layer on said annular portion, said annular portion having an inner circumferential wall and an outer circumferential wall radially disposed opposite one another and connected by a bottom wall so that said annular portion has a substantially U-shaped cross section, wherein one of said inner and outer circumferential walls has a notched portion provided thereon, said method comprising the steps of:

opening an upper molding die and a lower molding die, said upper and lower molding dies having a gate and a molding cavity formed therein;

positioning said annular portion in said molding cavity so that said gate is across from the notched portion and is directed toward one of said inner and outer circumferential walls positioned beyond the notched portion and said annular portion is positioned such that an open side of said substantially U-shaped cross section is directed upward;

closing said upper and lower molding dies;

injecting a synthetic resin into said cavity through said gate so as to form said coating layer on said annular portion of the core member, said injecting step including filling the U-shaped cavity to avoid the formation of voids; and opening said upper and lower molding dies so that the finished steering wheel may be removed.

2. A method of manufacturing a steering wheel according to claim 1, wherein said positioning step includes the step of locating said annular portion so that said notched portion is at a vertical height lower than a vertical height of said gate formed in said upper and lower dies.

3. A method of manufacturing a steering wheel according to claim 2, wherein said injecting step includes the step of infusing liquid urethane resin into said cavity.

4. A method of manufacturing a steering wheel according to claim 1, wherein said injecting step includes injecting said resin through said gate into a first groove defined by said inner circumferential wall, said outer circumferential wall and said bottom wall and a second groove defined by an outer surface of said annular portion having said U-shaped cross section and an inner surface of said upper and lower molding dies, and wherein said closing step includes bringing said first and second grooves into juxtaposition.

5. A method of manufacturing a steering wheel comprising the steps of:

providing a core member having an annular ring portion with a substantially U-shaped cross section, said annular ring portion being defined by an inner circumferential wall and an outer circumferential wall that are connected by a bottom wall, one of said inner and outer circumferential walls having a notched portion;

opening upper and lower molding dies to receive a core member having an annular ring portion with a substantially U-shaped cross section in an annular molding cavity formed by said dies;

positioning said annular ring portion of said core member so that an opening of said U-shaped cross section opens upward and defines a first annular groove member and said notched portion is opposed to a gate from which a synthetic resin is injected, said gate being disposed at a level above said notched portion, and said annular ring portion is positioned such that a second annular groove member is formed between an outer surface of said annular ring portion and an inner surface of said annular molding cavity;

injecting said synthetic resin through said gate so that the resin hits the circumferential wall, which does not have said notched portion therein, and so as to fill said molding cavity and form a coating layer, with said first and second annular groove members being filled by said resin at substantially the same time as said resin fills said molding cavity and said first annular groove being filled such that formation of voids is avoided; and opening said upper and lower dies so that the steering wheel may be removed.

6. A method as claimed in claim 5, wherein said providing step includes providing said annular member having a mid wall disposed between said inner and outer circumferential walls, with said mid wall having a notched portion formed therein substantially proximate the notched portion in said one of the inner and outer circumferential walls.

* * * * *